US008721093B2

(12) United States Patent
Hsiung (10) Patent No.: US 8,721,093 B2
(45) Date of Patent: May 13, 2014

(54) AUTOMATIC FOCUSING PROJECTING DEVICE AND METHOD OF AUTOMATIC FOCUSING (75) Inventor: Chien-Chih Hsiung, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 348 days.

(21) Appl. No.: 13/176,937

(22) Filed: Jul. 6, 2011

(65) Prior Publication Data

US 2012/0008109 A1    Jan. 12, 2012

(30) Foreign Application Priority Data

Jul. 9, 2010 (TW) ................................ 99122732 A (51) Int. Cl.
*G03B 21/14* (2006.01)
*G03B 3/00* (2006.01)
*G03B 21/00* (2006.01)
*H04N 3/22* (2006.01)
*H04N 3/26* (2006.01)

(52) U.S. Cl.
USPC ........................... 353/101; 353/121; 348/745

(58) Field of Classification Search
USPC ...................... 353/69, 101, 121, 76; 352/140; 348/745; 359/649–651, 698; 396/79, 396/124; 382/255
See application file for complete search history.

(56) References Cited

U.S. PATENT DOCUMENTS

| 2006/0204122 | A1* | 9/2006 | Onozawa ...................... 382/255 |
| 2007/0104475 | A1* | 5/2007 | Cheng ........................... 396/234 |
| 2009/0185139 | A1* | 7/2009 | Morikuni ....................... 353/30 |
| 2010/0214540 | A1* | 8/2010 | Sajadi et al. .................. 353/101 |

FOREIGN PATENT DOCUMENTS

TW            200412469         7/2004

* cited by examiner

*Primary Examiner* — William C Dowling
*Assistant Examiner* — Ryan Howard
(74) *Attorney, Agent, or Firm* — Tracy M. Heims; Apex Juris, pllc (57) ABSTRACT An automatic focusing projecting device includes an image light source, a first image lens, an image sensor, a second image lens, a memory, a microprocessor, and at least a driving device. The image light source projects an image onto a screen through the first image lens. The image sensor senses the image on the screen through the second image lens. The microprocessor calculates sensed signals from the image sensor to get a definition of the image, and then saves the definition in the memory. The microprocessor compares the definitions when the first image lens and the second image lens are moved to different positions to move the first image lens and the second image lens and locate the first image lens and the second image lens at their focusing positions respectively where the definitions of the image are the greatest.

6 Claims, 5 Drawing Sheets

AUTOMATIC FOCUSING PROJECTING DEVICE AND METHOD OF AUTOMATIC FOCUSING

BACKGROUND OF THE INVENTION

1. Field of the Invention

The present invention relates generally to a projector, and more particularly to an automatic focusing projecting device and a method of automatic focusing.

2. Description of the Related Art

Projectors are wildly used in business, education, and home life. In present days, portable micro-projectors are provided in market. Such projectors have a small size, and some of them are incorporated in camera, video camera, or cell phone.

To project a clear image on screen, user has to manually adjust the lens to a predetermined position on the optical axis to form the image on the screen, and that is so called "focusing". Most of the conventional projectors are equipped with manual focus system.

For a large projector, the lens is big and heavy, and the distance of the movement of the lens for focusing is long so that to manually adjust the focus of such projector is not easy for some people. However, for a micro-projector, the size of the lens is very small, and the distance of the movement of the lens for focusing is very short as well, and that is very difficult for manual focusing.

A conventional automatic focus system, taught in Taiwan patent 200412469, includes a rangefinder to find the distance between the projector and the screen, and a stepper motor to move the lens to a predetermined position. Such automatic focus system cannot identify that the image on the screen is clear or not, and the rangefinder needs large power. It cannot be used in a micro-projector.

SUMMARY OF THE INVENTION

The primary objective of the present invention is to provide a projecting device capable of automatic focusing.

The secondary objective of the present invention is to provide an automatic focusing projecting device, which can make sure that the image projected on the screen is clear.

The third objective of the present invention is to provide a method of automatic focusing projecting device, which can make sure that the image projected on the screen is clear.

According to the primary objective of the present invention, an automatic focusing projecting device includes an image light source, a first image lens, an image sensor, a second image lens, a memory, a microprocessor, and at least a driving device.

The image light source projects an image onto a plane through the first image lens. The image sensor senses the image on the plane through the second image lens. The microprocessor calculates sensed signals from the image sensor to get a definition of the image, and then saves the definition in the memory. The microprocessor compares the definitions when the first image lens and the second image lens are moved to different positions to move the first image lens and the second image lens according to the result of definition comparison.

A method of automatic focusing of the projecting device includes the following steps. The microprocessor controls the driving device to move the second image lens in a predetermined direction of an optical axis thereof for a distance, and activates the image sensor to sense the definition of the image through the second image lens after every movement of the second image lens, and then the microprocessor calculates the sensed signals to get definitions of the image when the second image lens is located at different positions. The micro processor compares the definitions and moves the second image lens to a focusing position where the definition of the image is greatest. Next, the microprocessor controls the driving device to move the first image lens, and activates the image sensor to sense the definition of the image through the second image lens after every movement of the first image lens, and then the microprocessor calculates the sensed signals to get definitions of the image when the first image lens is located at different positions. The micro processor compares the definitions and moves the first image lens to a focusing position where the definition of the image is greatest.

The projecting device of the present invention performs the auto-focusing process based on the definition of the image on the plane that it may be insure of a clear image on the plane after the auto-focusing process.

DETAILED DESCRIPTION OF THE INVENTION

Figure 1:
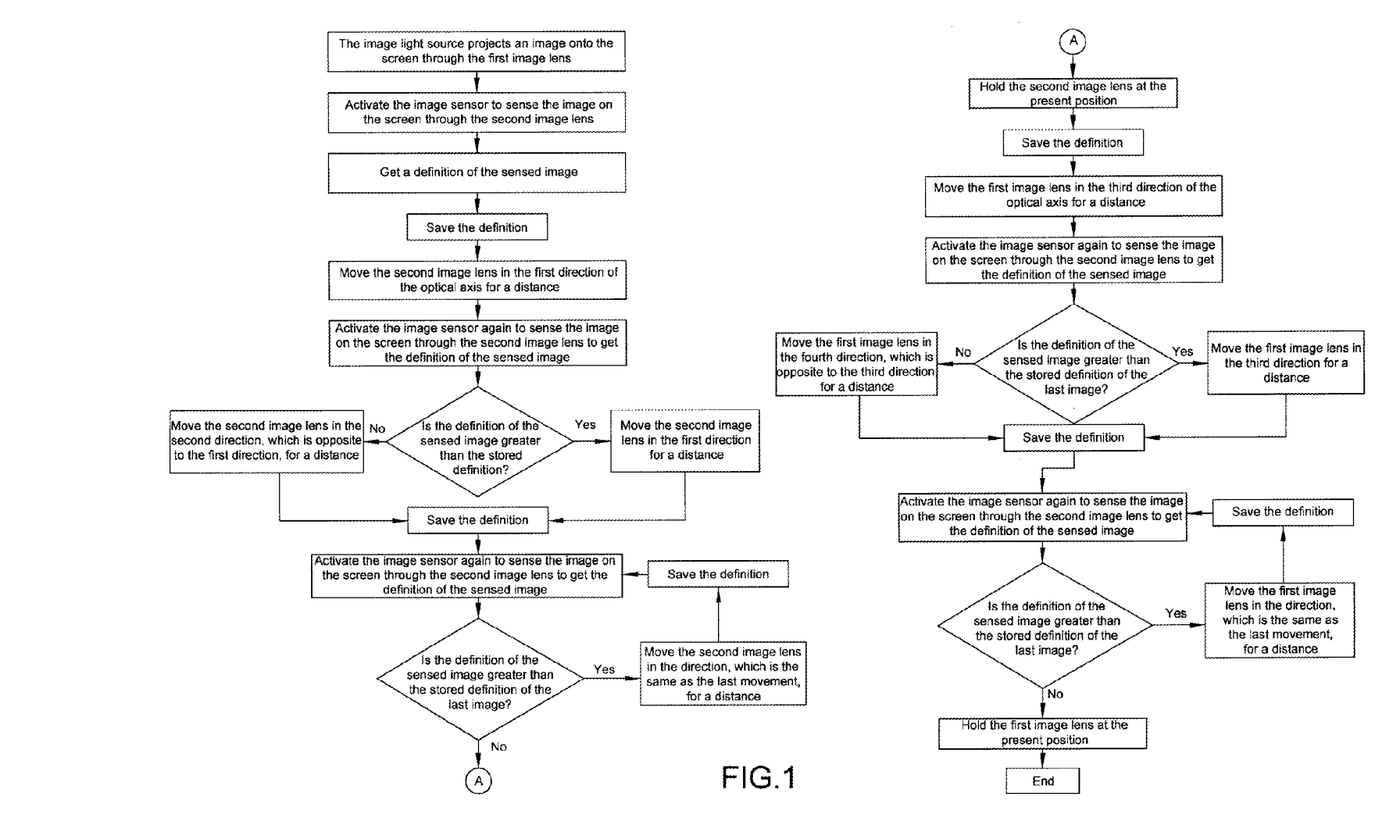
FIG. 1 is a flow chart of the method of the present invention.

As shown in FIG. 1, a method of automatic focusing of the present invention includes the following steps:

a. Project an image on a plane, such as a screen, through a first imaging lens.

b. Sense the image by an image sensor through a second image lens. The image sensor may be a charge-coupled device (CCD), complementary metal-oxide-semiconductor (CMOS), or other relative devices to sense the image on the screen and transform it into electrical signals for the following process.

c. Move the second image lens to a focusing position.

The second image lens is moved in a predetermined direction for a predetermined distance along an optical axis thereof. The image sensor is activated after every movement of the second image lens to sense the image on the screen and find a definition of the image. The second image lens is located at the position where the image has the greatest definition, and the position is called the focusing position of the second image lens.

In the present invention, the contrast of the image when the second image lens is moved to different position is found to be the definitions of the image.

In the present invention, the steps of moving the second image lens to the focusing position include:

c-1. Activate the image sensor to sense the image on the screen through the second image lens, and then calculate the contrast of the sensed image. It may calculate the contrast of a predetermined portion of the image or the contrasts of plural of portions of the image. A microprocessor is provided to calculate the contrast of the image. That is, the image sensor transmits the electrical signals of the image to the microprocessor, and then the microprocessor will calculate the contrast(s) of the specific portion(s) of the image.

c-2. Store the contrast(s) gotten in the step c-1. In the present invention, a memory is provided to store the contrasts.

c-3. Move the second image lens in a first direction of the axis of the second image lens for a predetermined distance. A driving device with a stepper motor or a driving device with electromagnetic power generator may be provided to move the second image lens. There still are some other devices to move the second image lens, and they are still in the scope of the present invention. The first direction may be a direction toward an image side of the second image lens (toward the image sensor), and it may be a direction toward an object side of the second image lens (toward the screen) also.

c-4. Activate the image sensor to sense the image on the screen through the second image lens and calculate a contrast of the sensed image.

c-5. Compare the contrast gotten in the step c-4 and the contrast stored in the memory in the step c-2, and move the second image lens in the first direction for another distance when the contrast gotten in the step c-4 is greater than the contrast stored in the memory in the step c-2, or move the second image lens in a second direction, which is opposite to the first direction, for a predetermined distance when the contrast stored in the memory in the step c-2 is greater than the contrast gotten in the step c-4. The distance of the second image lens moving in the second direction in the present step is greater than the distance of the second image lens moving in the first direction in the step c-1. The microprocessor will do the comparison of the contrasts. In other words, the microprocessor calculates the contrast of the image after movement of the second image lens, and then reads the contrast stored in the memory to compare them. After comparison, the microprocessor sends a first control signal or a second control signal to the driving device to move the second image lens.

c-6. Store the contrast gotten in the step c-4 in the memory.

c-7. Activate the image sensor again to sense the image through the second image lens, and calculate a contrast of the image.

c-8. Compare the contrast gotten in the step c-7 with the latest contrast stored in the memory, and move the second image lens in the direction the same as the direction of the last movement of the second image lens when the contrast gotten in the step c-7 is greater than the latest contrast stored in the memory.

c-9. Store contrast gotten in the step c-7.

c-10. Repeat the steps from the step c-7 to the step c-9 until the contrast gotten in the step c-7 is smaller than the latest contrast stored in the memory, and hold the second image lens at the present position. At this moment, the image on the screen has the greatest contrast, and the second image lens is located at the focusing position.

d. Move the first image lens to a focusing position.

The first image lens is moved in a predetermined direction for a predetermined distance along an optical axis thereof. The image sensor is activated after every movement of the first image lens to sense the image on the screen and find a definition of the image. The first image lens is located at the position where the image has the greatest definition, and the position is called the focusing position of the first image lens.

In the present invention, the contrast of the image when the first image lens is moved to different position is found to be the definitions of the image.

In the present invention, the steps of moving the first image lens to the focusing position include:

d-1. Move the first image lens in a third direction of the axis thereof for a predetermined distance. A driving device with a stepper motor or a driving device with electromagnetic power generator may be provided to move the first image lens. There still are some other devices to move the first image lens, and they are still in the scope of the present invention.

d-2. Activate the image sensor to sense the image on the screen through the second image lens and calculate a contrast of the sensed image.

d-3. Compare the contrast gotten in the step d-2 and the contrast stored in the memory, and move the first image lens in the third direction for another distance when the contrast gotten in the step d-2 is greater than the contrast stored in the memory, or move the first image lens in a fourth direction, which is opposite to the third direction, for a predetermined distance when the contrast stored in the memory is greater than the contrast gotten in the step d-2. The distance of the first image lens moving in the fourth direction in the present step is greater than the distance of the first image lens moving in the third direction in the step d-1. The third direction may be a direction toward an image side of the first image lens (toward the screen), and it may be a direction toward an object side of the second image lens (toward the light source) also.

d-4. Store the contrast gotten in the step d-2 in a memory.

d-5. Activate the image sensor again to sense the image through the second image lens, and calculate a contrast of the image.

d-6. Compare the contrast gotten in the step d-5 with the latest contrast stored in the memory, and move the first image lens in the direction the same as the direction of the last movement of the first image lens when the contrast gotten in the step d-5 is greater than the latest contrast stored in the memory.

d-7. Store contrast gotten in the step d-5.

d-8. Repeat the steps from the step d-5 to the step d-7 until the contrast gotten in the step d-5 is smaller than the latest contrast stored, and hold the first image lens at the present position. At this moment, the image on the screen has the greatest contrast, and the first image lens is located at the focusing position. Now, the projecting device completes the focusing process.

In conclusion, the focusing method of the present invention is to move the second image lens to find the contrasts of the image after every movement. When the microprocessor finds the greatest contrast of the image, the second image lens is moved to the focusing position. The first image lens will be moved to its focusing position after the second image lens is moved to the focusing position. The way of moving the first image lens to its focusing position basically is the same as the second image lens. When both of the first image lens and the second image lens have reached their focusing positions, the projecting device of the present invention has completed the focusing process.

The method of automatic focusing of the present invention senses the image on the screen and moves the image lens according to the sensed image to get a clear image on the screen after focusing process.

The way of moving the first image lens and the second image lens to their focusing positions as described above is one of several ways that may achieve the same purpose. Any method that may move the image lens to the focusing according to the sensed result of the image on the screen may be used in the present invention. For example, global search and Fibonacci search. For global search, it moves the image lens to every position in the range that the image lens may arrive to get the contrasts in every position, and then the contrasts are examined to find the greatest contrast and move the image lens to the position having the greatest contrast. For Fibonacci search, it finds the differential of the contrasts before and after one movement of the image lens, and turns the image lens to move in opposite direction when the differential of the contrasts goes from positive to negative or from negative to positive. The distance of every movement of the image lens is gradually shortened until it shortens to the shortest distance to find the focusing position of the image lens.

Figure 2:
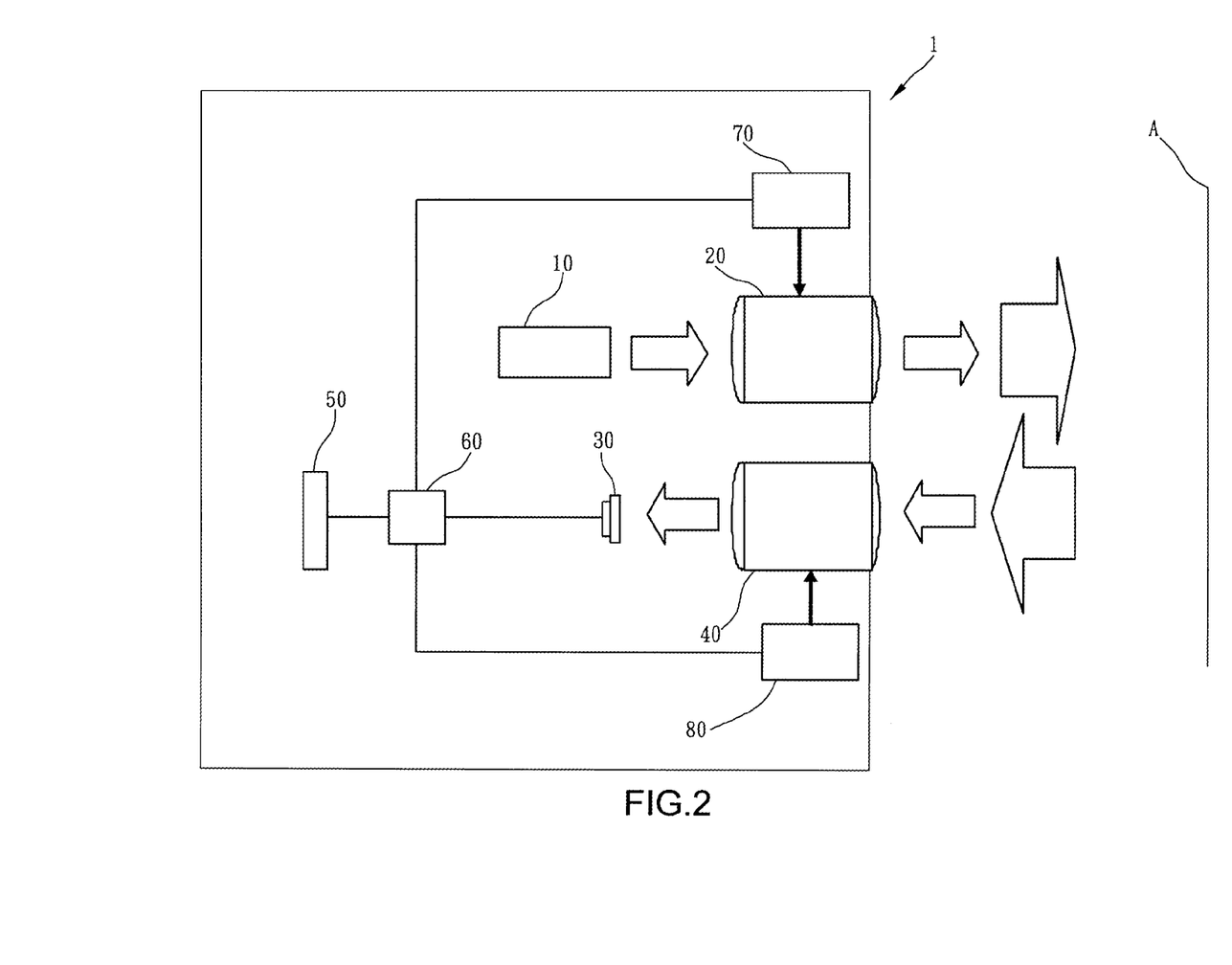
FIG. 2 is a block diagram of the projecting device of a first preferred embodiment of the present invention.

As shown in FIG. 2, the projecting device 1 performing the method of automatic focusing of the first preferred embodiment of the present invention includes an image light source 10, a first image lens 20 between the image light source 10 and a screen A that the image light source 10 may project an image onto the screen A through the first image lens 20, an image sensor 30, a second image lens 40 between the image sensor 30 and the screen A, a memory 50, a microprocessor 60 electrically connected to the image sensor 30 and the memory respectively, a first driving device 60 electrically connected to the microprocessor 60, and a second driving device 70 electrically connected to the microprocessor 60.

The image sensor 30 may sense an optical image and transform it into electrical signals. The image sensor 30 may be charge-coupled device (CCD), complementary metal-oxide-semiconductor (CMOS), or other relative devices.

The image sensor 30 senses the image on the screen A through the second image lens 40.

The memory 50 may be a flash memory or other relative devices.

The microprocessor 60 may receive the electrical signals from the image sensor 30 and calculate them to get a definition of the image. The definition will be sent to the memory to be stored. In the present invention, the contrast of the image is calculated to be the definition. The microprocessor 60 may compare the contrasts gotten in every movement of the image lens, and send a control signal to the driving device according to the result of comparison.

The first driving device 70 receives the control signal from the microprocessor 60 to move the first image lens 20 in an optical axis thereof. In the present invention, the first driving device 70 may include a stepped motor to be controlled by the control signal of the microprocessor 60, a gear set connected to the stepped motor, and a barrel, on which the first image lens is mounted, connected to the gear set. The first driving device 70 may includes a coil to generate electromagnetic power, a barrel to be moved by the electromagnetic power of the coil, and a spring to urge the barrel to a normal position. It still has other devices which may achieve the function of the first driving device 70, and they still are within the scope of the present invention.

The second driving device 80 receives the control signal from the microprocessor 60 to move the second image lens 40 in an optical axis thereof. In the present invention, the second driving device 80 may include a stepped motor to be controlled by the control signal of the microprocessor 60, a gear set connected to the stepped motor, and a barrel, on which the first image lens is mounted, connected to the gear set. The second driving device 80 may includes a coil to generate electromagnetic power, a barrel to be moved by the electromagnetic power of the coil, and a spring to urge the barrel to a normal position. It still has other devices which may achieve the function of the second driving device 80, and they still are within the scope of the present invention.

Figure 3:
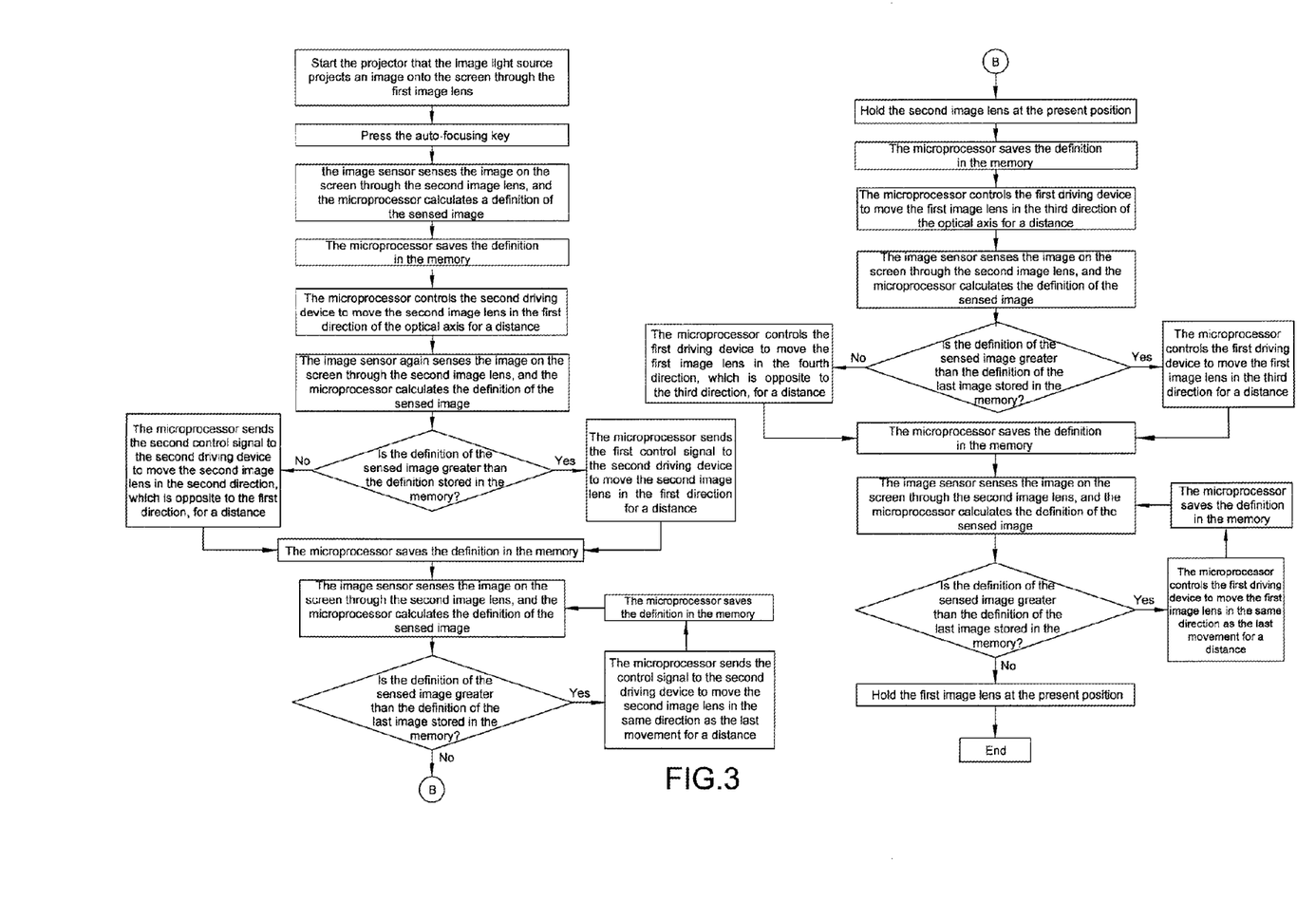
FIG. 3 is a flow chart of the procedure of automatic focusing.

As shown in FIG. 3, the process of automatic focusing of the projecting device 1 of the present invention includes the following steps:

First, activate the projecting device 1 to project an image onto the screen A through the image light source 10 and the first image lens 20.

Next, activate an auto-focusing function of the projecting device 1. In practice, the projecting device 1 is provided with a key to be pressed to activate the auto-focusing function.

After press the key, the image sensor 30 senses the image on the screen A through the second image lens 40 and transforms it into electrical signals to send the signals to the microprocessor 60.

The microprocessor 60 calculates the electrical signals from the image sensor 30 to get a contrast of the image and store the contrast in the memory 50.

Next, the microprocessor 60 controls the second driving device 80 to move the second image lens 40 in a first direction of the optical axis for a predetermined distance, and then the image sensor 30 senses the image on the screen A again and transforms it into electrical signals to send the signals to the microprocessor 60. The microprocessor 60 calculates the electrical signals from the image sensor 30 to get a contrast of the sensed image. The first direction may be a direction toward an image side of the second image lens 40 (toward the image sensor 30), and it may be a direction toward an object side of the second image lens 40 (toward the screen A) also.

Next, the microprocessor 60 reads the contrast stored in the memory 50 and compares it with the contrast of the sensed image. The microprocessor 60 will send a first control signal to the second driving device 80 to move the second image lens 40 in the first direction for another distance when the contrast of the sensed image is greater than the contrast stored in the memory 50, or the microprocessor 60 will control the second driving device 80 to move the second image lens 40 in a second direction, which is opposite to the first direction, for a predetermined distance when the contrast of the sensed image is smaller than the contrast stored in the memory 50. When the second image lens 40 is moved in the second direction, the distance of the second image lens 40 moving in the second direction is greater than the distance of the second image lens 40 moving in the first direction. The contrast of the sensed image will be stored in the memory 50.

The image sensor 30 will senses the image on the screen A again after the movement of the second image lens 40 and send the sensed result to the microprocessor 60 to get a contrast of the sensed image, and the microprocessor 60 compares the contrast of the sensed image with the contrast stored in the memory 50. The microprocessor 60 will send a first control signal to the second driving device 80 to move the second image lens 40 for a predetermined distance when the contrast of the sensed image is greater than the contrast stored in the memory 50. The direction of the present movement is the same as the previous movement. The contrast of the sensed image will be stored in the memory 50.

Repeat the steps of the previous paragraph until the microprocessor 60 finds that the contrast of the sensed image is smaller than the contrast stored in the memory 50. The second image lens 40 will be held in the present position, and this position is the focusing position of the second image lens 40.

Next, the microprocessor 60 controls the first driving device 70 to move the first image lens 20 in a third direction of the optical axis for a predetermined distance, and then the image sensor 30 senses the image on the screen A again and transforms it into electrical signals to send the signals to the microprocessor 60. The microprocessor 60 calculates the electrical signals from the image sensor 30 to get a contrast of the sensed image. The third direction may be a direction toward an image side of the first image lens 20 (toward the image light source 10), and it may be a direction toward an object side of the first image lens 20 (toward the screen A) also.

Next, the microprocessor 60 reads the contrast stored in the memory 50 and compares it with the contrast of the sensed image. The microprocessor 60 will send a second control signal to the first driving device 70 to move the first image lens 20 in the third direction for another distance when the contrast of the sensed image is greater than the contrast stored in the memory 50, or the microprocessor 60 will control the first driving device 70 to move the first image lens 20 in a fourth direction, which is opposite to the third direction, for a predetermined distance when the contrast of the sensed image is smaller than the contrast stored in the memory 50. When the first image lens 20 is moved in the fourth direction, the distance of the first image lens 20 moving in the fourth direction is greater than the distance of the first image lens 20 moving in the third direction. The contrast of the sensed image will be stored in the memory 50.

The image sensor 30 will senses the image on the screen A again after the movement of the first image lens 20 and send the sensed result to the microprocessor 60 to get a contrast of the sensed image, and the microprocessor 60 compares the contrast of the sensed image with the contrast stored in the memory 50. The microprocessor 60 will send a second control signal to the first driving device 70 to move the first image lens 20 for a predetermined distance when the contrast of the sensed image is greater than the contrast stored in the memory 50. The direction of the present movement is the same as the previous movement. The contrast of the sensed image will be stored in the memory 50.

Repeat the steps of the previous paragraph until the microprocessor 60 finds that the contrast of the sensed image is smaller than the contrast stored in the memory 50. The first image lens 20 will be held in the present position, and this position is the focusing position of the second image lens 20.

After complete the movements of the second image lens 40 and the first image lens 20 to their focusing positions, the process of automatic focusing of the projecting device 1 of the present invention is finished. At this moment, the image on the screen A is clearest.

The automatic focusing process of the projecting device 1 of the present invention is based on the definition of the image on the screen A that it can ensure that the image on the screen A is clearest after the automatic focusing process.

The way of moving the first image lens and the second image lens to their focusing positions as described above is one of several ways that may achieve the same purpose. Any method that may move the image lens to the focusing according to the sensed result of the image on the screen may be used in the present invention. For example, global search and Fibonacci search. For global search, it moves the image lens to every position in the range that the image lens may arrive to get the contrasts in every position, and then the contrasts are examined to find the greatest contrast and move the image lens to the position having the greatest contrast. For Fibonacci search, it finds the differential of the contrasts before and after one movement of the image lens, and turns the image lens to move in opposite direction when the differential of the contrasts goes from positive to negative or from negative to positive. The distance of every movement of the image lens is gradually shortened until it shortens to the shortest distance to find the focusing position of the image lens.

Figure 4:
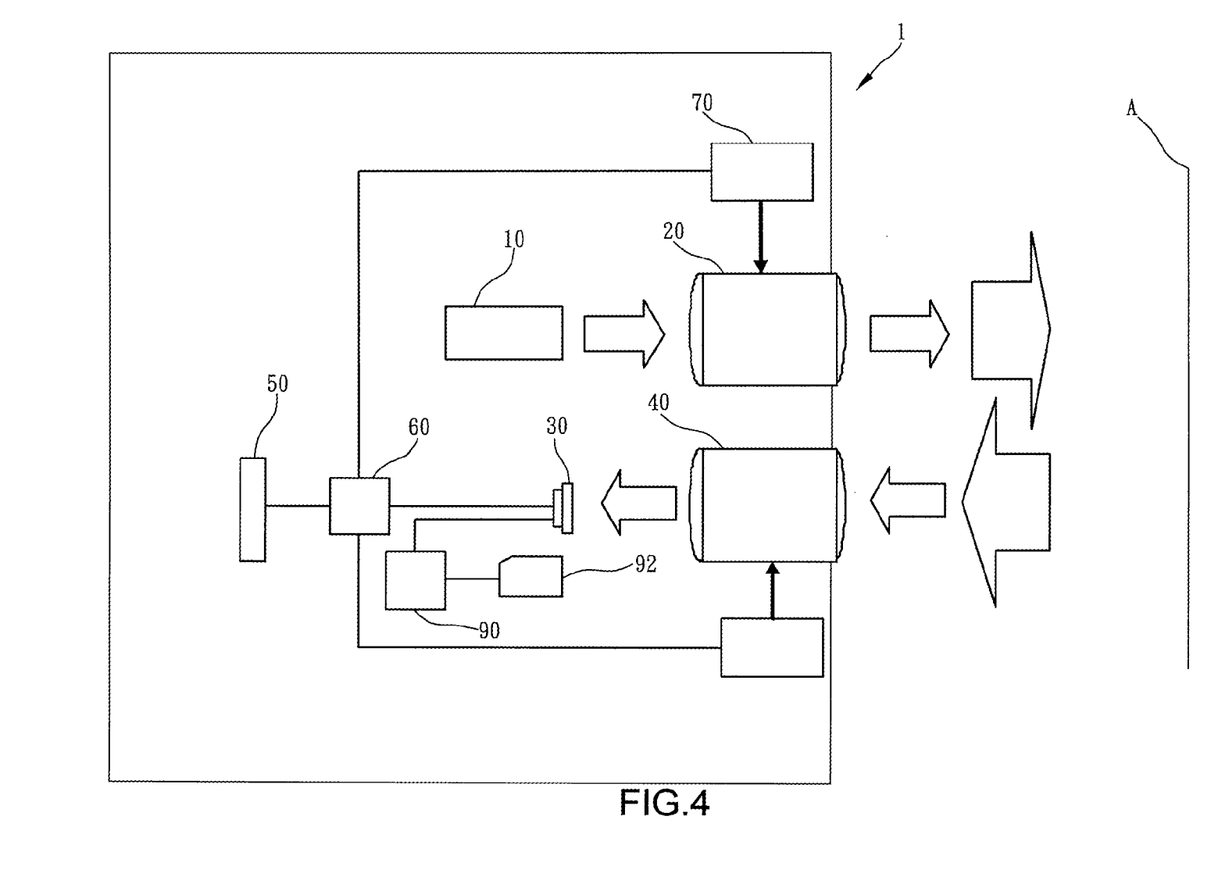
FIG. 4 is a block diagram of the projecting device of a second preferred embodiment of the present invention.

As shown in FIG. 4, a projecting device 1 of the second preferred embodiment of the present invention, which is similar to the first preferred embodiment, except that the projecting device 1 further is provided with an encoder 90 electrically connected to the image sensor 30 and a storage device 92, such as memory card, hard disk drive, and other relative devices, electrically connected to the image encoder 90. The encoder 90 may encode the electrically signals from the image sensor 30 and save it in the storage device 92. Therefore, the projecting device 1 of the second preferred embodiment has both functions of camera and video camera.

Figure 5:
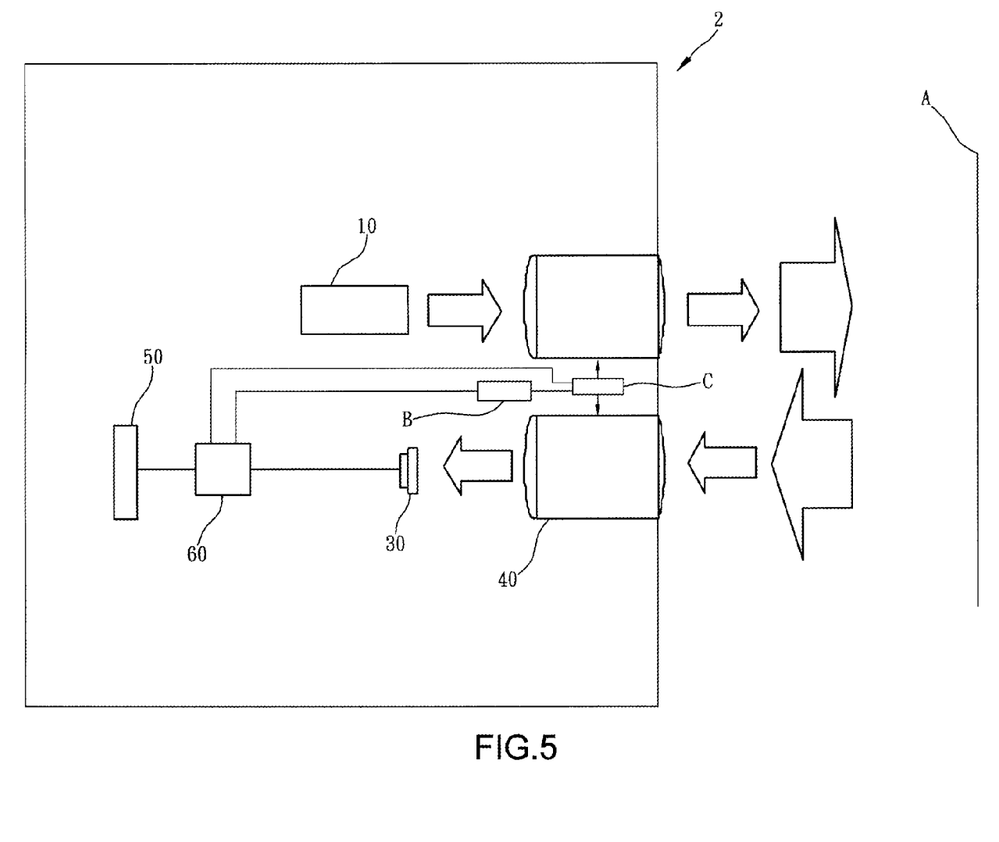
FIG. 5 is a block diagram of the projecting device of a third preferred embodiment of the present invention.

As shown in FIG. 5, a projecting device 2 of the third preferred embodiment of the present invention, which has an image light source 10, a first image lens 20 that the image light source 10 projects an image onto a screen A through the first image lens 20, an image sensor 30, a second image lens 40, a memory 50, and a microprocessor 60 electrically connected to the image sensor 30 and the memory 50.

The characters of the projecting device 2 of the third preferred embodiment are that the projecting device 2 has a driving device B and a switching device C. The driving device B is electrically connected to the microprocessor 60, and the switching device C has an end connected to the driving device B and the other end connected to the first image lens 20 and the second lens 40 respectively. The switching device C may switch the driving device B to move the first image lens 20 or to move the second lens 40. The switching device C is electrically connected to the microprocessor 60.

Therefore, the microprocessor 60 controls the switching device C to switch the driving device B to move the first image lens 20 or to move the second lens 40.

With the design of the third preferred embodiment, only one driving device is needed in the projecting device to reduce the cost. The description above is a few preferred embodiments of the present invention. These equivalences of the present invention are still in the scope of claim construction of the present invention.

What is claimed is:
1. A method of automatic focusing of a projecting device, comprising the steps of:
  a. providing an image light source to project an image onto a plane through a first image lens;
  b. providing an image sensor to sense the image on the plane through a second image lens;
  c. moving the second image lens in a predetermined direction of an optical axis for a predetermined distance, and activating the image sensor to sense the image on the plane to get a definition of the image after every movement of the second image lens, and locating the second image lens at a position where the definition is greatest;
  d. moving the first image lens in a predetermined direction of an optical axis for a predetermined distance, and activating the image sensor to sense the image on the plane to get a definition of the image after every movement of the first image lens, and locating the first image lens at a position where the definition is greatest;
  wherein the definition of the image defined in the step c and step d is contrast of the image; and
  wherein the step c further includes the steps of:
    c-1. activating the image sensor to sense the image on the plane through the second image lens, and getting a contrast of the image;
    c-2. storing the contrast gotten in the step c-1 in a memory;
    c-3. moving the second image lens in a first direction of the optical axis for a predetermined distance;
    c-4. activating the image sensor again to sense the image on the plane through the second image lens, and getting a contrast of the image;
    c-5. comparing the contrast gotten in the step c-4 with the contrast stored in the memory in the step c-2, and moving the second image lens in the first direction of the optical axis for a predetermined distance when the contrast gotten in the step c-4 is greater than the contrast stored in the memory in the step c-2, or moving the second image lens in a second direction, which is opposite to the first direction, for a predetermined distance when the contrast gotten in the step c-4 is smaller than the contrast stored in the memory in the step c-2;

c-6. storing the contrast gotten in the step c-4 in the memory;

c-7. activating the image sensor again to sense the image on the plane through the second image lens, and getting a contrast of the image;

c-8. comparing the contrast gotten in the step c-7 with the contrast stored in the memory, and moving the second image lens in the direction, which is that same as the last movement, for a predetermined distance when the contrast gotten in the step c-7 is greater than the contrast stored in the memory;

c-9. storing the contrast gotten in the step c-7 in the memory; and c-10. repeating the steps from the step c-7 to the step c-9 until contrast gotten in the step c-7 is less than the contrast stored in the memory, and then holding the second image lens at the present position.

2. The method as defined in claim 1, wherein the distance of moving the second image lens in the second direction in the step c-5 is greater than the distance of moving the second image lens in the first direction in the step c-3.

3. The method as defined in claim 1, wherein the step d includes the steps of:

d-1. moving the first image lens in a third direction of the optical axis for a predetermined distance to project a new image onto the plane;

d-2. activating the image sensor again to sense the image on the plane through the second image lens, and getting a contrast of the image;

d-3. comparing the contrast gotten in the step d-2 with the contrast stored in the memory, and moving the first image lens in a third direction of the optical axis for a predetermined distance when the contrast gotten in the step d-2 is greater than the contrast stored in the memory, or moving the first image lens in a fourth direction, which is opposite to the third direction, for a predetermined distance when the contrast gotten in the step d-2 is smaller than the contrast stored in the memory;

d-4. storing the contrast gotten in the step d-2 in the memory;

d-5. activating the image sensor again to sense the image on the plane through the second image lens, and getting a contrast of the image;

d-6. comparing the contrast gotten in the step d-5 with the contrast stored in the memory, and moving the first image lens in the direction, which is that same as the last movement, for a predetermined distance when the contrast gotten in the step d-5 is greater than the contrast stored in the memory;

d-7. storing the contrast gotten in the step d-5 in the memory;

d-8. repeating the steps from the step d-5 to the step d-7 until contrast gotten in the step d-5 is smaller than the contrast stored in the memory, and then holding the first image lens at the present position.

4. The method as defined in claim 1, wherein the definition of the image is calculated from a portion of the image.

5. The method as defined in claim 1, the definition of the image is calculated from different portions of the image.

6. The method as defined in claim 3, wherein the distance of moving the second image lens in the fourth direction in the step d-3 is greater than the distance of moving the second image lens in the third direction in the step d-1.

* * * * *